(12) United States Patent
Callaghan et al.

(10) Patent No.: US 9,807,645 B1
(45) Date of Patent: Oct. 31, 2017

(54) ADJUSTING COMMUNICATION CAPACITY IN A MULTI-STAGE ROUTING NETWORK

(71) Applicant: Amazon Technologies, Inc., Seattle, WA (US)

(72) Inventors: Stephen Callaghan, Seattle, WA (US); Leonard Thomas Tracy, Bothell, WA (US); Mark Noel Kelly, Seattle, WA (US); Alan Michael Judge, Dublin (IE); Justin Oliver Pietsch, Bothell, WA (US); Amit Sahoo, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 211 days.

(21) Appl. No.: 14/748,916

(22) Filed: Jun. 24, 2015

(51) Int. Cl.
| | |
|---|---|
| *H04L 12/715* | (2013.01) |
| *H04L 12/729* | (2013.01) |
| *H04W 28/02* | (2009.01) |
| *H04L 12/781* | (2013.01) |
| *H04W 40/00* | (2009.01) |
| *H04L 12/721* | (2013.01) |
| *H04L 12/775* | (2013.01) |
| *H04L 12/773* | (2013.01) |

(52) U.S. Cl.
CPC ......... *H04W 28/0289* (2013.01); *H04L 45/52* (2013.01); *H04W 40/005* (2013.01); *H04L 45/123* (2013.01); *H04L 45/125* (2013.01); *H04L 45/583* (2013.01); *H04L 45/60* (2013.01)

(58) Field of Classification Search
None
See application file for complete search history.

(56) References Cited

U.S. PATENT DOCUMENTS

| | | | | |
|---|---|---|---|---|
| 5,276,425 A | * | 1/1994 | Swanson | H04Q 3/68 340/2.22 |
| 5,629,925 A | * | 5/1997 | Pfeiffer | H04L 49/55 340/2.21 |
| 8,902,751 B1 | * | 12/2014 | Zhou | H04L 12/6418 370/235 |
| 2003/0214944 A1 | * | 11/2003 | Towles | H04Q 3/68 370/388 |
| 2008/0212472 A1 | * | 9/2008 | Musacchio | H04Q 3/68 370/232 |
| 2008/0285449 A1 | * | 11/2008 | Larsson | H04L 49/1515 370/232 |
| 2010/0061242 A1 | * | 3/2010 | Sindhu | H04L 41/0806 370/235 |

(Continued)

Primary Examiner — Candal Elpenord
(74) Attorney, Agent, or Firm — Klarquist Sparkman, LLP

(57) ABSTRACT

A method for adjusting capacity in a multi-stage routing network includes monitoring a number of available connections between a router in a first stage of a multi-stage router network and one or more routers in a second stage of the multi-stage router network. Each of the stages of the multi-stage router network may include a plurality of routers. The method may also include detecting that the number of available connections falls below a threshold number. A notification can be sent to one or more routers in a third stage of the multi-stage router network that the router in the first stage is deprioritized. The one or more routers in the third stage can be operated so that communications to the first stage are routed to one or more other routers in the first stage.

23 Claims, 8 Drawing Sheets

(56) References Cited

U.S. PATENT DOCUMENTS

2010/0165984 A1* 7/2010 Aybay .................... H04L 49/15
                                                    370/388
2015/0244647 A1* 8/2015 Gopalan ............... H04L 49/201
                                                    370/386

* cited by examiner

ADJUSTING COMMUNICATION CAPACITY IN A MULTI-STAGE ROUTING NETWORK

BACKGROUND

Cloud computing is the use of computing resources (hardware and software) that are available in a remote location and accessible over a network, such as the Internet. In a computing environment with many computing devices, such as a virtual server or cloud computing environment with many server computers and communication endpoints (e.g., routers), the use of computing resources can provide a number of advantages including cost advantages and/or the ability to adapt rapidly to changing computing resource needs.

To facilitate increased utilization of data center resources, routers within the computing environment may use Border Gateway Protocol (BGP) multipath to share load among multiple communication paths in order to provide increased communication capacity. However, computing environments using BGP multipath load sharing may often experience communication failure scenarios, resulting in network congestion that may remain undetected for an extended period of time.

BRIEF DESCRIPTION OF THE DRAWINGS

Various embodiments in accordance with the present disclosure will be described with reference to the drawings, in which.

DETAILED DESCRIPTION

The following description is directed to techniques and solutions supporting adjusting communication capacity in a multi-stage routing network. The multi-stage router network can include a Clos network or a conventional network, with one or more routers in each of a plurality of stages. A stage can include two or more routers. A router can be configured so that when a pre-determined number of communication links with a neighboring stage are not established, the router can apply a maintenance activity to the router communication sessions, thereby making the router less preferred (e.g., for receiving data from another neighboring stage). In this regard, the router (or a separate router monitoring service within the multi-stage routing network) can be configured to monitor available connections between the router and the routers within at least one neighboring stage of the network. When the number of the available connections drops below a threshold number, the maintenance activity may be applied. Optionally, the router may be disconnected and after the number of available connections has increased to (or above) the threshold, the router can be reconnected (or the maintenance activity may be cancelled). By removing the router from network traffic (e.g., by applying the maintenance activity or disconnecting the router), utilization of the network can be increased since chances for potential failure/congestion scenarios are decreased.

Figure 1:
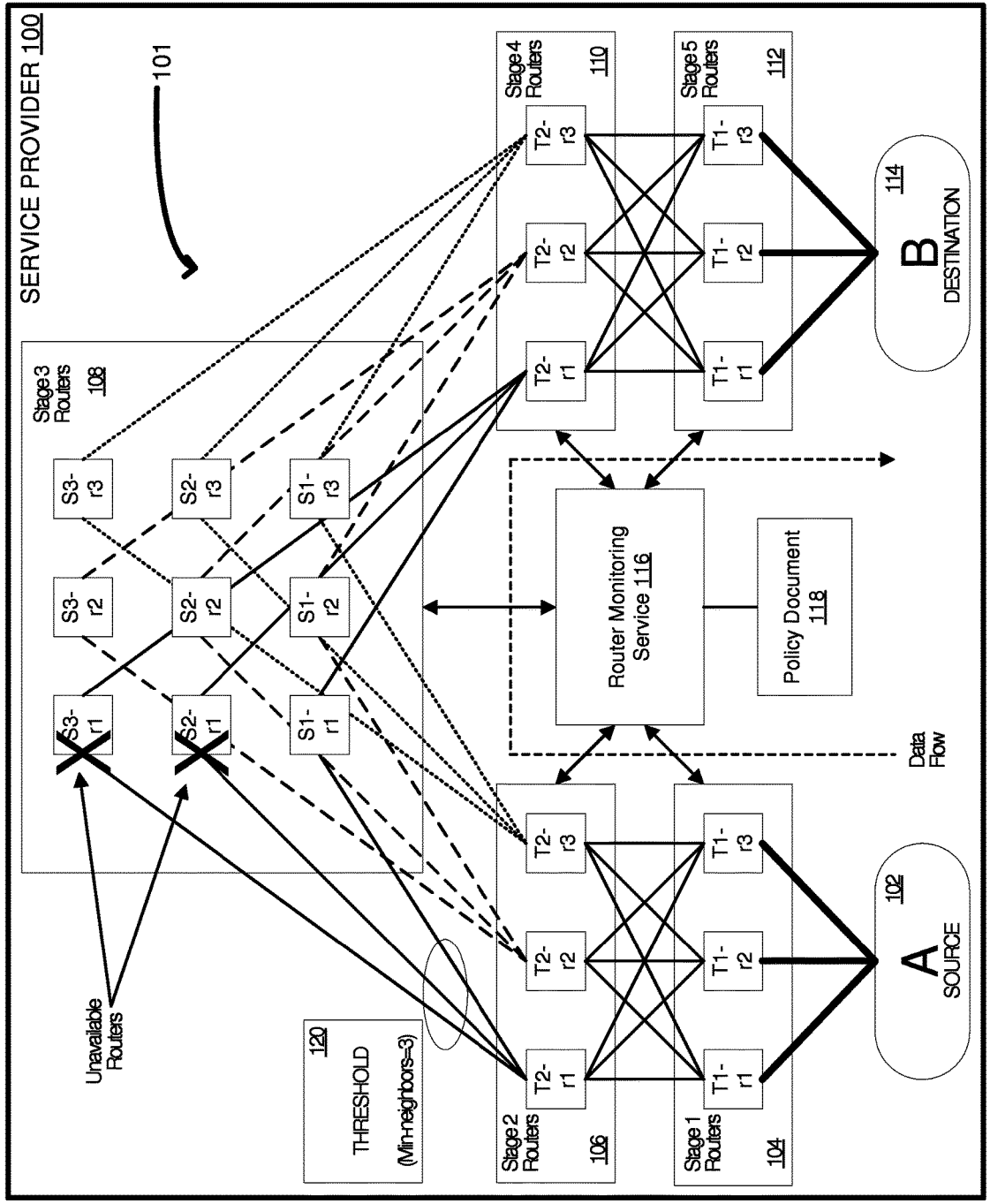
FIG. 1 is a diagram of an example multi-stage routing network within a service provider environment supporting adjusting communication capacity, in accordance with an embodiment of the disclosure.

FIG. 1 is a diagram of an example multi-stage routing network within a service provider environment supporting adjusting communication capacity, in accordance with an embodiment of the disclosure. Referring to FIG. 1, the multi-stage routing network 101 may be implemented within a service provider environment 100. The service provider environment 100 may be a multi-tenant cloud network environment where one or more clients may run one or more virtual machine instances (VMIs) on one or more server computers. The server computers may be, for example, client servers operated by (or on behalf of) one or more clients of the service provider environment 100.

The multi-stage routing network 101 may include a plurality of routers in each of a plurality of stages. For example, FIG. 1 illustrates a five-stage routing network with a first stage 104, a second stage 106, a third stage 108, a fourth stage 110, and a fifth stage 112. Communication traffic can be routed from source 102 to destination 114 via the routers of stages 104-112. The first network stage 104 includes routers T1-r1, T1-r2, and T1-r3. The second network stage 106 includes routers T2-r1, T2-r2, and T2-r3. The third network stage 108 includes routers S1-r1, S1-r2, S1-r3, S2-r1, S2-r2, S2-r3, S3-r1, S3-r2, and S3-r3. The fourth network stage 110 includes routers T2-r1, T2-r2, and T2-r3. The fifth network stage 112 includes routers T1-r1, T1-r2, and T1-r3.

Even though a specific number of routers are illustrated in each network stage of the network 101, the disclosure is not limited in this regard and an arbitrary number of routers can be used for each of the stages 104-112. Additionally, the multi-stage routing network 101 can be implemented as a Clos network or as a conventional network (e.g., a conventional network having one or more core, aggregation and access stages). Furthermore, the term "router" as used herein may be used collectively so as to include routers as well other network devices that can perform routing functionalities, such as network switches, endpoints, servers, and so forth, with the ability to receive communication from a first network stage (or a communication source) and forward it to a second network stage (or to a network destination).

The multi-stage routing network 101 may further include a router monitoring service 116 and a policy document 118. The router monitoring service 116 may use suitable circuitry, interfaces, logic, and/or code and may be operable to perform router monitoring and management functionalities to ensure a minimum communication capacity between at least two of the stages of the multi-stage routing network. More specifically, the router monitoring service 116 may monitor available connections between a first router in one of the stages and at least a second router in a second (e.g., neighboring) stage. In instances, when the number of available connections between the first router and the at least second router drops below a threshold number of connections, then the router monitoring service 116 may apply a maintenance activity to the communication sessions of the router, thereby making the communication sessions (and the router) less preferred. In other instances, the router monitoring service 116 may disconnect the router (or otherwise make it unavailable to any neighboring stages). The router monitoring service 116 may then notify at least a third router in a third (e.g., neighboring) stage of the maintenance activity (or that the router is disconnected/unavailable).

The policy document 118 may specify one or more threshold values that can be used by the protocol selection service 116 to perform adjusting of the communication capacity of the multi-stage routing network 101. For example, the policy document 118 may specify the threshold value 120, which may be associated with a specific stage of the multi-stage routing network. The policy document 118 may also specify additional threshold values associated with one or more other stages of the multi-stage routing network. The policy document 118 may be updated by, for example, an administrator via an administrative portal (not illustrated in FIG. 1).

Even though the multi-stage routing network 101 uses a separate router monitoring service 116, the present disclosure is not limited in this regard. More specifically, the functionalities performed by the router monitoring service 116 may be implemented within one or more of the routers of the multi-stage routing network 101. In this regard, each router may implement the router monitoring/management functionalities of the service 116, and may (e.g., periodically at pre-determined intervals) monitor available communication links to other stages and adjust communication capacity accordingly (e.g., the router may apply a maintenance activity or otherwise disconnect from the network) if the number of available links drops below a threshold value.

In accordance with an example embodiment of the disclosure, the router monitoring service 116 may be implemented as a stand-alone service within the multi-stage routing network 101 (as illustrated in FIG. 1) or it may be implemented as a code library (i.e., software) within one or more of the routers of the multi-stage routing network.

Network data may be communicated from the source 102 to the destination 114 using routers in the network stages 104-112. As seen in FIG. 1, the maximum theoretical capacity for communicating data from the source A to the destination B is 9 communication links (there are 9 links coming out of stages 104-110). In operation, two of the routers in stage 108 (e.g., routers S3-r1 and S2-r1) may become unavailable, which may result in router T2-r1 in stage 106 to have only one available communication link. From the perspective of the routers T1-rx in stage 104, all three routers T2-rx in stage 106 are equal (i.e., each having the same communication capacity with three communication links to stage 108). This may cause network congestion as router T2-r1 has only a single available link.

The router monitoring service 116 may detect that the upstream routers S3-r1 and S2-r1 are unavailable, leaving only a single communication link between routers T2-r1 and S1-r1. The router monitoring service may obtain (e.g., from the policy document 118) a threshold value 120 associated with, for example, the routers of stage 106. The threshold value 120 may equal 3 (indicated as min-neighbors=3 in FIG. 1), which means that communication capacity can be adjusted for a given router if the number of available communication links to a neighboring stage falls below three. In the processing scenario of FIG. 1, since the number of available communication links for router T2-r1 has fallen below the threshold value 120, the router monitoring service will apply a maintenance activity to router T2-r1, thereby making router T2-r1 less preferred (e.g., to the routers in stage 104). In this regard, a notification may be sent to the routers in stage 104, notifying them of a high communication cost to the stage 108 routers via the router T2-r1. The stage 104 routers T1-rx may then reduce (or stop) traffic to router T2-r1, making the maximum communication capacity at the output of stage 106 only six (i.e., three links each for routers T2-r2 and T2-r3).

In the alternative, the router monitoring and capacity adjustment functionalities of the service 116 may be implemented within, and performed by, one or more of the routers (e.g., router T2-r1) within the multi-stage routing network 101. For example, router T2-r1 may detect that routers S3-r1 and S2-r1 are unavailable and the number of available communication links for router T2-r1 has fallen below the threshold value 120. Router T2-r1 may then apply a maintenance activity (e.g., to one or more of its outgoing communication links), thereby making router T2-r1 less preferred (e.g., to the routers in stage 104). Optionally, router T2-r1 may disconnect from the network and send a notification of its unavailability to one or more other routers in the network (e.g., the stage 104 routers which send data to router T2-r1).

Even though the data flow, as indicated in FIG. 1, is from source 102 to destination 114, the disclosure is not limited in this regard and data (e.g., confirmation/acknowledgement communications) may flow in the reverse direction (i.e., from destination 114 to the source 102). In this regard, the router monitoring service 116 (and/or any of the routers that implement the functionality of the service 116 discussed herein) may monitor available communication links in both directions. For example, router T2-r1 may detect that routers T1-r1 and T1-r2 in stage 104 are unavailable (instead of routers S3-r1 and S2-r1 in stage 108). In this instance, router T2-r1 may determine that it only has one available communication link to stage 104 (e.g., via router T1-r3) and the number of available communication links has dropped below the threshold value 120 (i.e., number of available links has dropped below three). Optionally, a different threshold value may be used for different communication directions (i.e., one threshold value may be used for communication links between stage 106 routers and stage 108 routers, and a different threshold value may be used for communication links between stage 106 routers and stage 104 routers).

After determining that it only has one available communication link to stage 104, router T2-r1 may apply a maintenance activity to one or more of its outgoing communication links to stage 104, thereby making router T2-r1 less preferred (e.g., to the routers in stage 108). Optionally, router T2-r1 may disconnect from the network and send a notification of its unavailability to one or more other routers in the network (e.g., the stage 108 routers, which in the current example scenario send data to router T2-r1).

Figure 2:
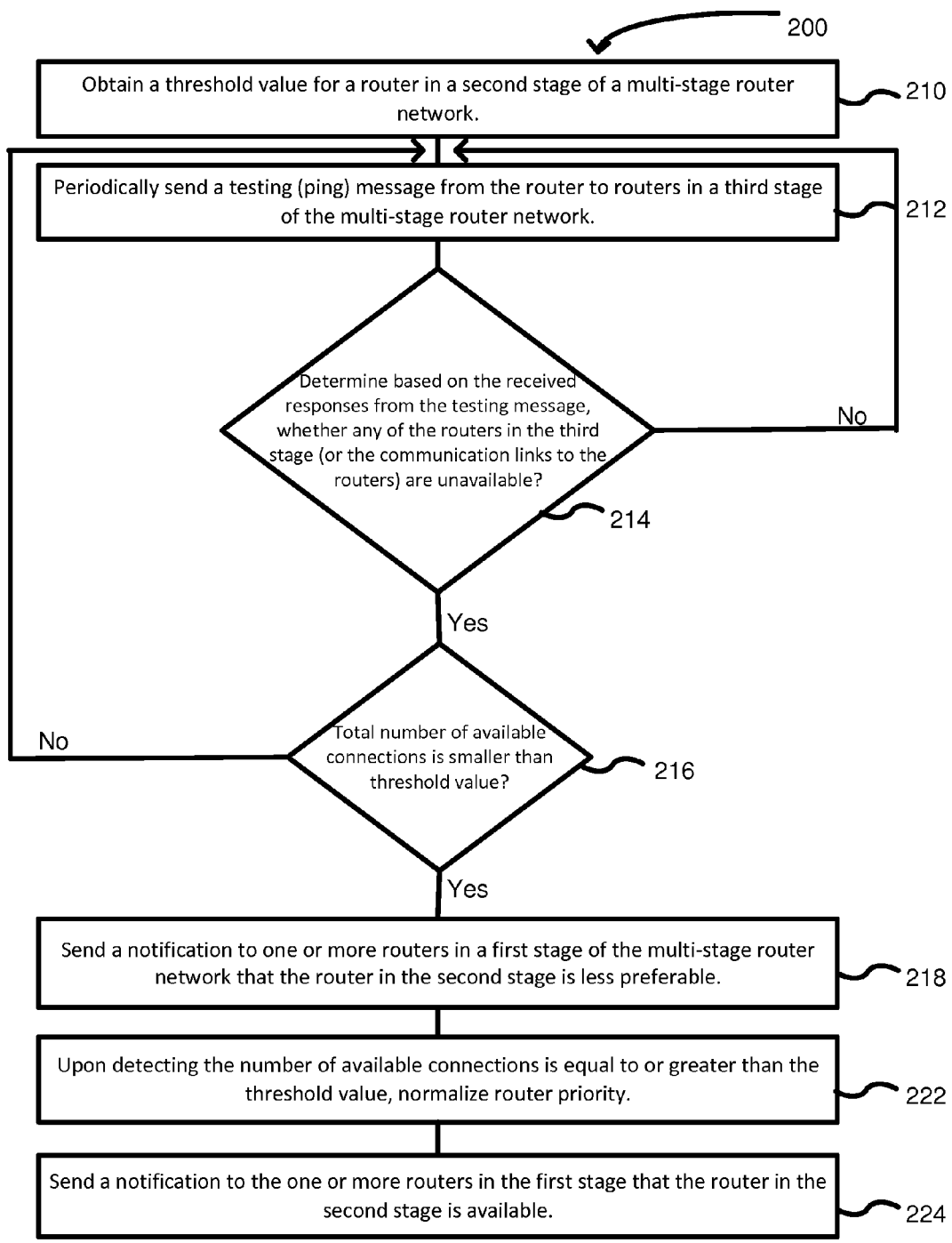
FIG. 2 is a flowchart of an example method of adjusting communication capacity in a multi-stage routing network, in accordance with an embodiment of the disclosure.

FIG. 2 is a flowchart of an example method of adjusting communication capacity in a multi-stage routing network, in accordance with an embodiment of the disclosure. Referring to FIG. 2, the example method 200 may start at 210, when a threshold value may be obtained for a router in a second stage of a multi-stage router network. For example, the second stage router T2-r1 (or the router monitoring service 116) may obtain the threshold value 120, which may be used for routers in the second router stage 106 of the multi-stage routing network 101. The threshold value 120 may be obtained from a policy document 118 and may indicate that a minimum number of available communication links per router is set to three (i.e., min-neighbors=3).

At 212, a testing (ping) message may be periodically sent from the router to routers in a third stage of the multi-stage router network. For example, second stage router T2-r1 may periodically send a ping message (or another type of testing communication) to the routers Sx-r1 in the third stage 108 it is connected to. At 214, it may be determined based on the received responses from the testing message, whether any of the routers in the third stage (or the communication links to the routers) are unavailable. For example, the router monitoring service 116 (or the router T2-r1) may determine whether any of the communication links to the routers in the third stage 108 are unavailable. If all routers in stage 108 are available, then processing may resume at 212. If one or more of the routers in the third stage 108 (or one or more of the communication links to the routers 108 are interrupted/unavailable), then processing may continue at 216.

At 216, it may be determined whether the total number of available connections is smaller than threshold value. For example, the router monitoring service 116 or the second stage router T2-r1 may determine whether the number of available connections to the third stage 108 is smaller than the threshold value 120 obtained from the policy document 118. If the number of available connections is not smaller than the threshold value 120, then processing may continue at 212. However, if the number of available connections is smaller than the threshold value 120 (e.g., only one connection is available to router T2-r1, which is smaller than the threshold value of three), then processing may continue at 218.

At 218, a notification may be communicated to one or more routers in a first stage of the multi-stage router network that the router in the second stage is less preferable for communication (optionally, the notification may be that the router is deactivated or otherwise unavailable). To indicate that the router is less preferable, a different weight can be assigned to each router in the second stage or the router may be disabled altogether. For example, the router monitoring service 116 (or the router T2-r1) may send a notification to the routers T1-rx in the first stage 104 that the router T2-r1 has maintenance activity on its communication links (and is therefore less preferred) or that the router T2-r1 is disconnected/deactivated (or otherwise unavailable). If the notification sent to stage 104 is notifying of a maintenance activity for router T2-r1, then router T2-r1 can initiate the maintenance activities on one or more of its available communication links. If the notification sent to stage 104 is notifying of a disconnected/unavailable router T2-r1, then router T2-r1 may disconnect itself from the network 101 (or become deactivated and indicate that it is unavailable). In an example embodiment, the router T2-r1 may first initiate the maintenance activity (or deactivate/disconnect) prior to a notification being provided to the stage 104 routers.

At 222, upon detecting the number of available connections is equal to or greater than the threshold value, the router priority may be normalized (and, e.g., the router may be activated/connected back for normal communications). For example, the router monitoring service 116 or the router T2-r1 may continue to monitor the number of available connections (e.g., the number of connections router T2-r1 has to the routers in stage 108), and upon detecting the number of available connections to router T2-r1 is equal to or greater than the threshold value 120, then priority for router T2-r1 can be normalized (so that the router is equally preferred to other stages as remaining routers in the second stage). At 224, a notification can be sent to the one or more routers in the third stage that the router in the first stage is available. For example, the router monitoring service 116 or the router T2-r1 may send a notification to one or more of the routers in the network 101 (e.g., the routers in stage 104) that router T2-r1 is available at full capacity (and can be considered equally together with routers T2-r2 and T2-r3 when data is communicated to any of the stage 106 routers). In some embodiments the notification sent at 224 can be sent after a delay, which may be configurable in length.

Figure 4:
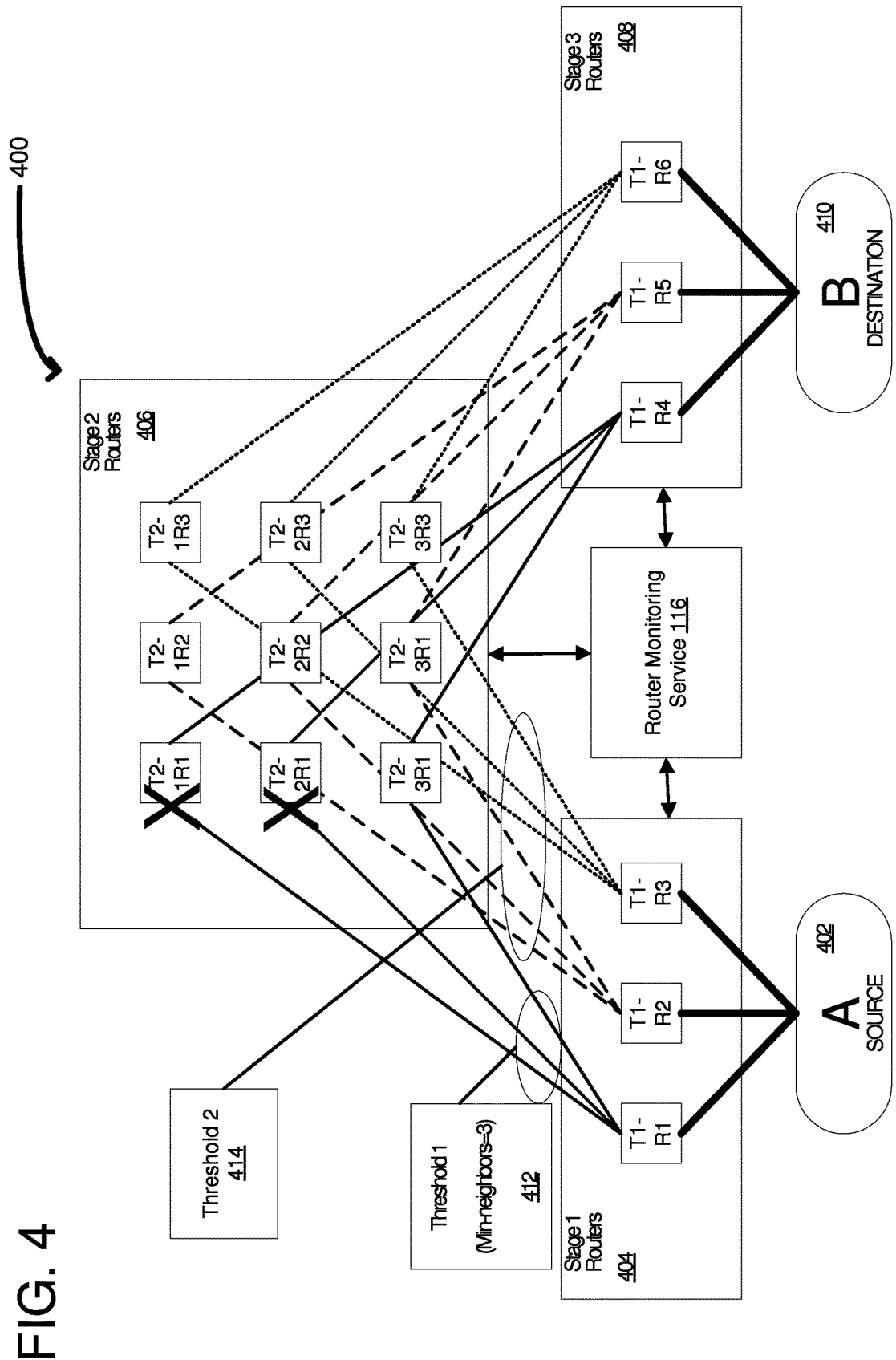
FIG. 4 is a diagram of an example three-stage routing network supporting adjusting communication capacity when one or more routers are unavailable, in accordance with an embodiment of the disclosure.

FIG. 4 is a diagram of an example three-stage routing network supporting adjusting communication capacity when one or more routers are unavailable, in accordance with an embodiment of the disclosure. Referring to FIG. 4, the three-stage network 400 is similar in many respects to the five-stage network 101 in FIG. 1. More specifically, communications from the source 402 to the destination 410 can be routed through stages 404, 406 and 408. Router monitoring can be performed by the router monitoring service 116 (e.g., as explained herein above in reference to FIG. 1) and/or by any of the routers in the network 400.

In accordance with an example embodiment of the disclosure, the multi-stage router network 400 may use more than one threshold values (e.g., threshold values 412 and 414) in order to adjust communication capacity. For example, threshold value 412 may be used in similar way to threshold value 120 of FIG. 1, i.e., to apply a maintenance activity or disconnect the router T1-r1. After the router T1-r1 has been disconnected, communications can be routed to routers T1-r2 and T1-r3 (which routers can be equally considered by the source 402). The available connections for routers T1-r2 and T1-r3 may also be monitored (e.g., by the service 116 or by each router). In instances when the number of available connections (for one or more of the remaining routers T1-r2 and T1-r3, or collectively for both routers) falls below another threshold value (e.g., threshold value 414), then the first router T1-r1 can be reconnected back and load can be equally distributed between the three routers of stage 404.

For example, threshold values 412 and 413 can both be equal to 3. After routers T2-Ir1 and T2-2r1 in stage 406 become unavailable, router T1-r1 has only a single available connection (e.g., to router T2-3r1), which is below the first threshold 412. Router T1-r1 can then be disconnected and a notification can be sent to the source 402 that router T1-r1 is unavailable and only routers T1-r2 and T1-r3 should be used. However, the number of available connections for both remaining routers T1-r2 and T1-r3 may drop from the maximum 6 available connections (e.g., the number of available connections for each remaining router may drop from 3 to 1, collectively 2 available connections for both routers). Since the number of available connections (i.e., 2) for both routers is smaller than the second threshold value 414, then the first router T1-r1 can be reconnected back so that each of the three routers in stage 404 has a single available connection. Source 402 can then be notified that all three routers in stage 404 have a single available connection to stage 406 and all routers in stage 404 can be treated equally for purposes of load distribution. An example flow of a processing method for this implementation is described below in reference to FIG. 3.

Figure 3:
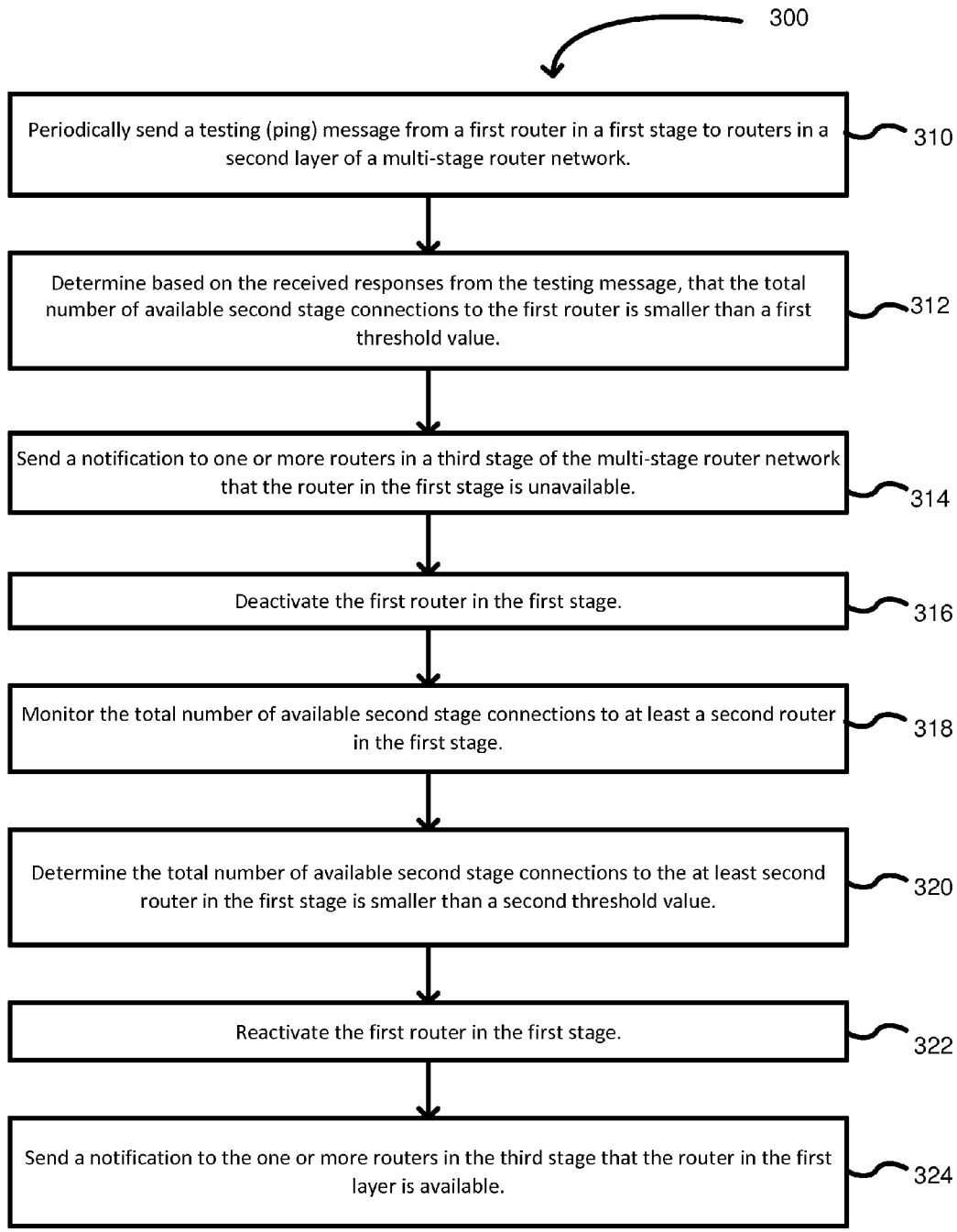
FIG. 3 is a flowcharts of another example method of adjusting communication capacity in a multi-stage routing network using multiple threshold values, in accordance with an embodiment of the disclosure.

FIG. 3 is a flowcharts of another example method of adjusting communication capacity in a multi-stage routing network using multiple threshold values, in accordance with an embodiment of the disclosure. Referring to FIGS. 3-4, the example method 300 may start at 302, when a testing (ping) message may be sent periodically from a first router in a first stage (e.g., T1-r1) to routers in a second stage (e.g., routers in stage 406) of the multi-stage router network (e.g., 400). At 312, the router monitoring service 116 (or the router T1-r1) can determine based on the received responses from the testing message, that the total number of available second stage connections to the first router is smaller than a first threshold value. For example, router T1-r1 can determine that due to router unavailability (e.g., routers T2-1r1 and T2-2r1 are unavailable), the number of available connections (i.e., 1) is smaller than a first threshold value 412 (e.g., threshold value min-neighbors=3).

At 314, a notification may be sent to one or more routers in a third stage of the multi-stage router network that the router in the first stage is unavailable. For example, router T1-r1 may send a notification to another stage that it receives communications from (or the source 402 as seen in FIG. 4). At 316, the router T1-r1 can be deactivated (and a notification sent to the source 402). At 318, the total number of available second stage connections to at least a second router in the first stage may be monitored. For example, the router monitoring service 116 (or one or more of the routers T1-r2 and T1-r3) may monitor the number of available connections to the remaining routers T1-r2 and T1-r3.

At 320, the router monitoring service 116 (or one or more of the routers T1-r2 and T1-r3) may determine that the total number of available second stage (e.g., stage 406) connections to the at least second router in the first stage is smaller than a second threshold value. For example, the number of available connections for both remaining routers T1-r2 and T1-r3 may drop from the maximum 6 available connections (e.g., the number of available connections for each remaining router may drop from 3 to 1, collectively 2 available connections for both routers). Since the number of available connections (i.e., 2) for both routers is smaller than the second threshold value 414, then the first router T1-r1 can be reactivated back (e.g., at 322) so that each of the three routers in stage 404 has a single available connection. At 324, source 402 can be notified that all three routers in stage 404 have a single available connection to stage 406 and all routers in stage 404 can be treated equally (i.e., equally preferred) for purposes of load distribution.

Figure 5:
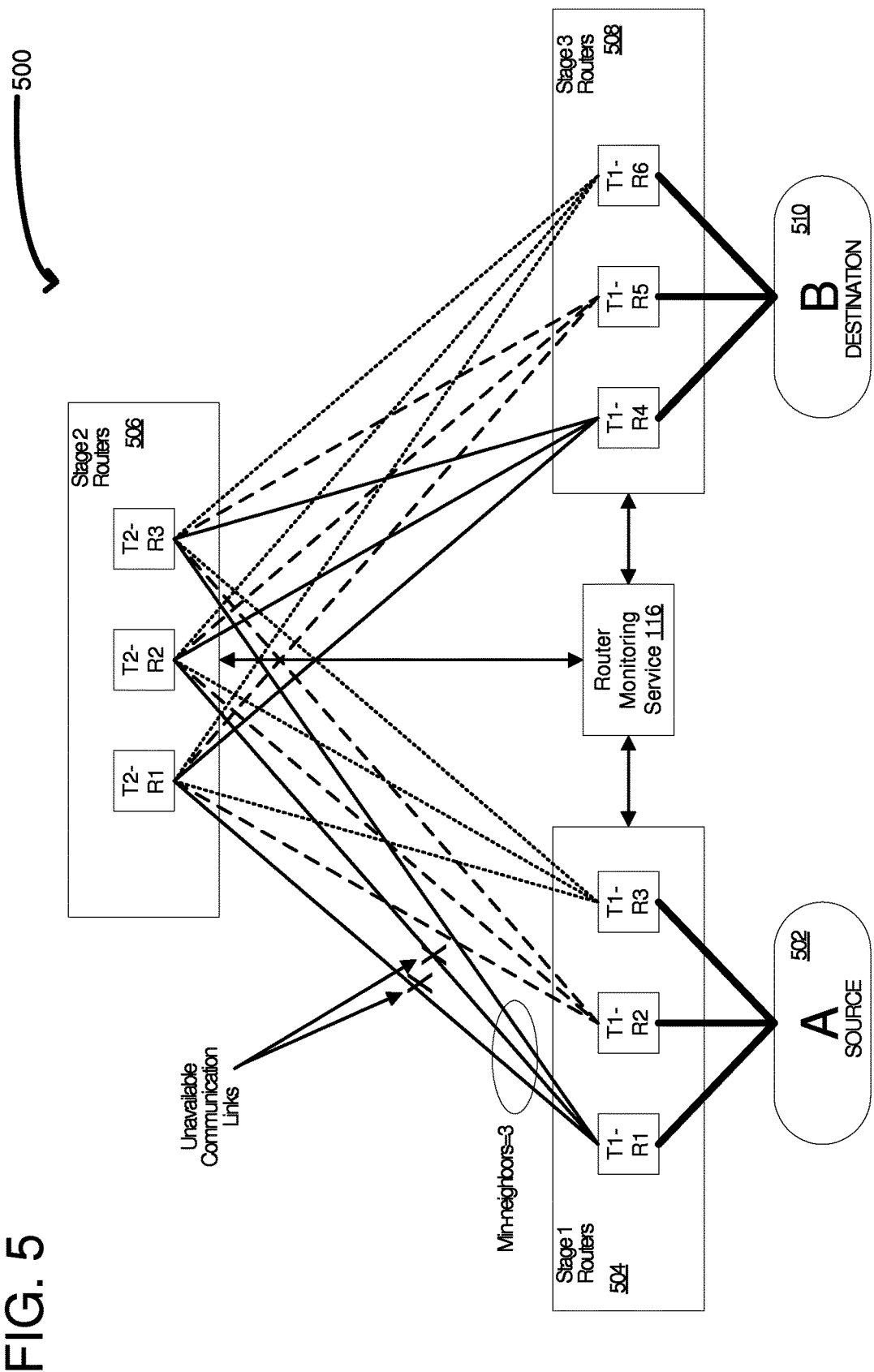
FIG. 5 is a diagram of an example three-stage routing network supporting adjusting communication capacity when one or more communication links are unavailable, in accordance with an embodiment of the disclosure.

FIG. 5 is a diagram of an example three-stage routing network supporting adjusting communication capacity when one or more communication links are unavailable, in accordance with an embodiment of the disclosure. Referring to FIG. 5, the three-stage routing network 500 is similar in many respects to the three-stage routing network 400 and the multi-stage routing network 101. FIG. 5 illustrates the possibility that instead of having one or more routers in a given stage become unavailable (e.g., one or more of the routers in stage 506), one or more of the communication links between the stages may become unavailable (e.g., broken/interrupted). In the particular example of FIG. 5, the communication links between router T1-r1 and routers T2-r1 and T2-r2 in stage 506 have become unavailable. Adjusting capacity may be performed in ways as described herein above in reference to FIGS. 1-4.

Figure 6:
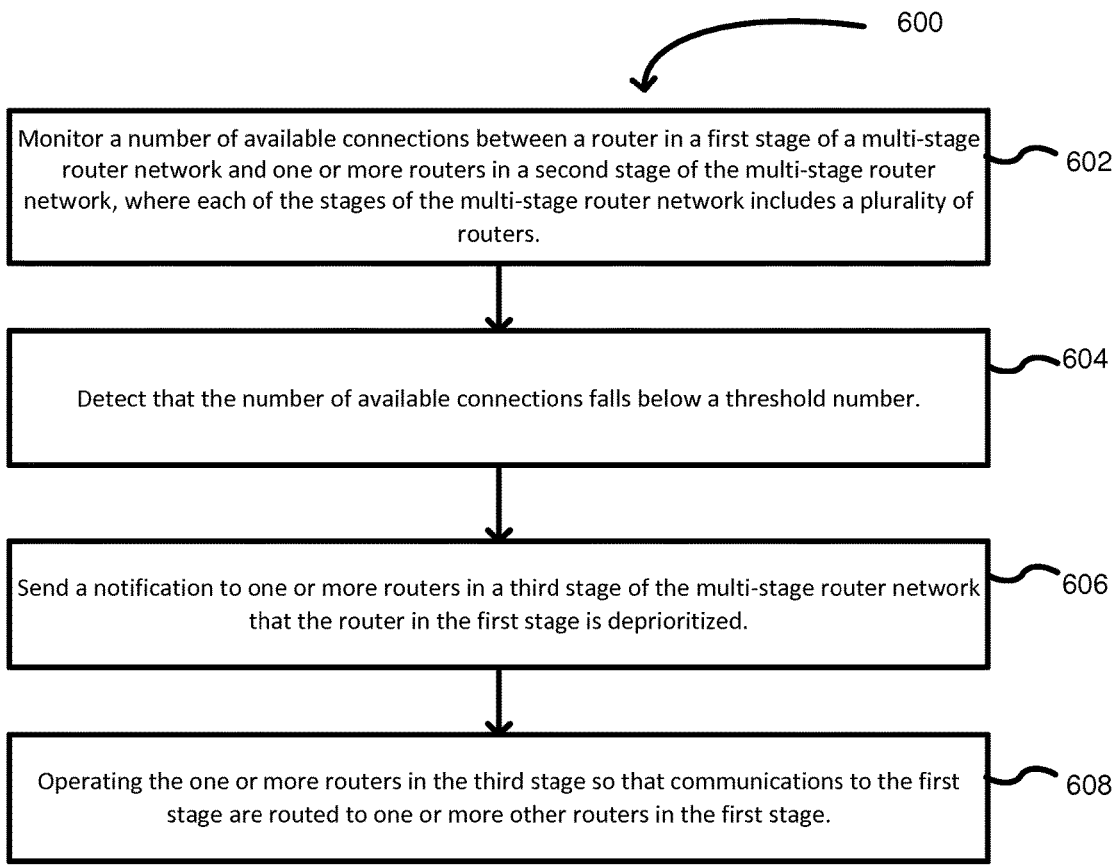
FIGS. 6-7 are flowcharts of example methods of adjusting communication capacity in a multi-stage routing network, in accordance with an embodiment of the disclosure.
Figure 7:
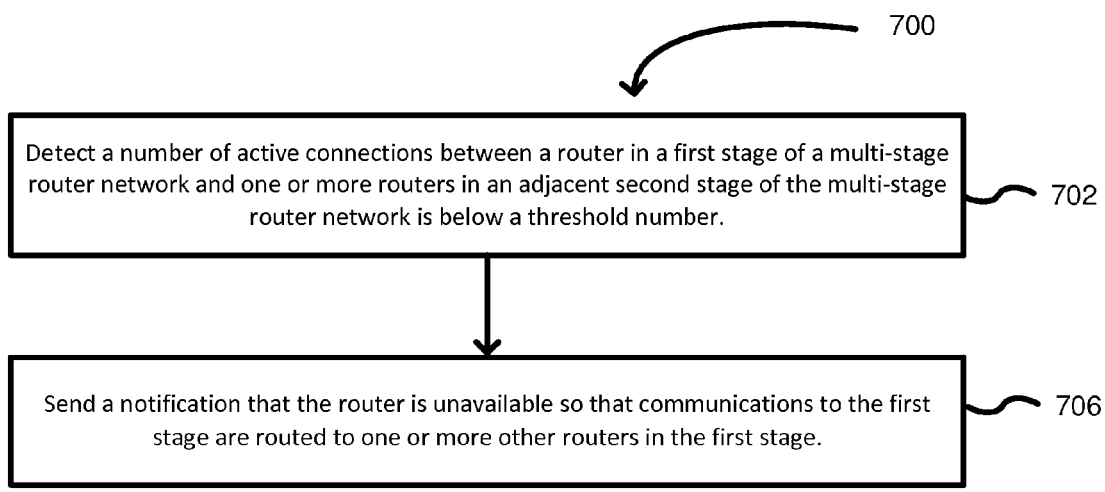

FIGS. 6-7 are flowcharts of example methods of adjusting communication capacity in a multi-stage routing network, in accordance with an embodiment of the disclosure. Referring to FIGS. 1 and 6, the example method 600 may start at 602, when a number of available connections between a router in a first stage of a multi-stage router network and one or more routers in a second stage of the multi-stage router network may be monitored. As seen in FIG. 1, each of the stages 104-112 of the multi-stage router network includes a plurality of routers. For example, the router monitoring service 116 (or the router T2-r1) may determine whether any of the communication links to the routers in the stage 108 are unavailable.

At 604, the router monitoring service 116 or the router T2-r1 may determine that the number of available connections is smaller than the threshold value 120 obtained from the policy document 118. At 606, a notification may be communicated to one or more routers in a third stage of the multi-stage router network that the router in the first stage is deprioritized. For example, the router monitoring service 116 (or the router T2-r1) may send a notification to the routers T1-rx in stage 104 that the router T2-r1 has maintenance activity on its communication links (and is therefore less preferred) or that the router T2-r1 is deactivated or disconnected (or otherwise unavailable). At 608, the one or more routers in the third stage may be operated so that communications to the first stage are routed to one or more other routers in the first stage. For example, if the notification sent to stage 104 is notifying of a maintenance activity for router T2-r1, then router T2-r1 can initiate the maintenance activities on one or more of its available communication links. If the notification sent to stage 104 is notifying of a deactivated/disconnected/unavailable router T2-r1, then router T2-r1 may disconnect itself from the network 101 (or otherwise indicate that it is unavailable or less preferred).

Referring to FIGS. 1 and 7, the example method 700 may start at 702, when it may be detected that a number of active connections between a router in a first stage of a multi-stage router network and one or more routers in an adjacent second stage of the multi-stage router network is below a threshold number. For example, the router monitoring service 116 or the router T2-r1 may determine that the number of available connections is smaller than the threshold value 120 obtained from the policy document 118. A notification that the router is unavailable can be sent/communicated (e.g., to one or more other routers within the network 101). For example, the router monitoring service 116 (or the router T2-r1) may send a notification to the routers T1-rx in the first stage 104 that the router T2-r1 is less preferred for communication than one or more of the remaining routers in the stage 106. At 706, the router T2-r1 (or the router monitoring service 116) may send a notification that the router is unavailable so that communications to the first stage (e.g., stage 106) are routed to one or more other routers in the first stage (e.g., routers T2-r2 and T2-r3).

Figure 8:
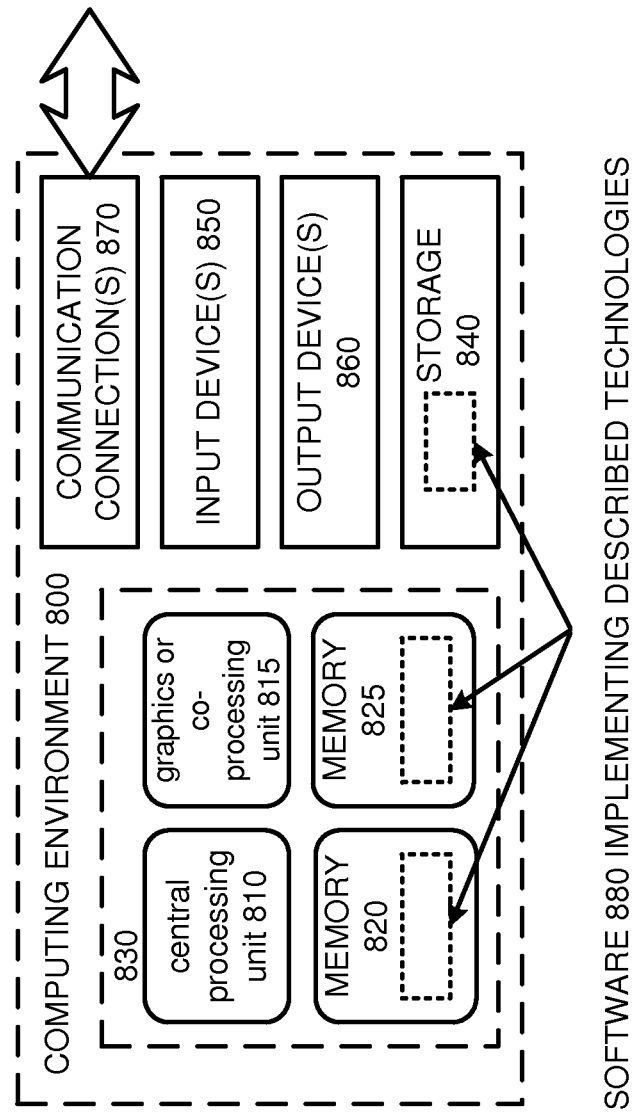
FIG. 8 depicts a generalized example of a suitable computing environment in which the described innovations may be implemented.

FIG. 8 depicts a generalized example of a suitable computing environment in which the described innovations may be implemented. Referring to FIG. 8, the computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations (e.g., functionalities) described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a customer-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method for adjusting capacity in a multi-stage routing network, the method comprising:

monitoring a number of available connections between a first router in a first stage of the multi-stage router network having a first threshold number, a second router in the first stage of the multi-stage network having a second threshold number, and one or more routers in a second stage of the multi-stage router network, wherein each of the stages of the multi-stage router network includes a plurality of routers;

detecting that the number of available connections for the first router falls below the first threshold number;

detecting that the number of available connections for the second router falls below the second threshold number;

sending a notification to one or more routers in a third stage of the multi-stage router network based on the number of available connections for the first router falling below the first threshold number and the number of available connections for the second router falling below the second threshold number that the routers in the first stage are deprioritized; and operating the one or more routers in the third stage so that communications to the first stage are routed to one or more other routers in the first stage.

2. The method according to claim 1, further comprising:
detecting that the number of available connections between the first router in the first stage and the one or more routers in the second stage is equal to or greater than the first threshold number.

3. The method according to claim 2, further comprising:
upon detecting that the number of available connections between the first router in the first stage is equal to or greater than the first threshold number, sending a notification to the one or more routers in the third stage that the first router in the first stage is priority normalized.

4. The method according to claim 1, wherein the first threshold number is associated with the first stage, the method further comprising:
obtaining the first threshold number from a policy document of the multi-stage routing network.

5. The method according to claim 1, further comprising:
communicating a test message to the plurality of routers in the second stage to determine the number of available connections.

6. The method according to claim 1, wherein the multi-stage routing network comprises a core stage, an aggregation stage, and an access stage.

7. The method according to claim 1, wherein the first threshold number and the second threshold number are not equal.

8. A non-transitory computer-readable storage medium including instructions that, upon execution, cause a computer system to:
detect that a number of active connections between a first router in a first stage of a multi-stage router network is below a first threshold number;
detect that a number of active connections between a second router in the first stage of a multi-stage router network is below a second threshold number;
detect that one or more routers in an adjacent second stage of the multi-stage router network is below the first threshold number; and
send a notification based on the number of active connections for the first router falling below the first threshold number and the number of active connections for the second router falling below the second threshold that the first and second routers are unavailable so that communications to the first stage are routed to one or more other routers in the first stage.

9. The computer-readable storage medium according to claim 8, wherein the instructions, upon execution, further cause the computer system to:
send the notification to one or more routers in an adjacent third stage of the multi-stage router network that the first router is deprioritized.

10. The computer-readable storage medium according to claim 9, wherein the instructions, upon execution, further cause the computer system to:
upon detecting the number of active connections is equal to or greater than the first threshold number, send a notification to the one or more routers in the adjacent third stage that the router is priority normalized.

11. The computer-readable storage medium according to claim 8, wherein the instructions, upon execution, further cause the computer system to set priority of the first router such that no traffic is communicated to the router.

12. The computer-readable storage medium according to claim 8, wherein the instructions, upon execution, further cause the computer system to:
communicate a test message to the one or more routers in the adjacent second stage.

13. The computer-readable storage medium according to claim 12, wherein the instructions, upon execution, further cause the computer system to:
determine the number of active connections based on a number of responses to the test message received at the router.

14. The computer-readable storage medium according to claim 8, wherein the instructions, upon execution, further cause the computer system to:
monitor the number of active connections between the first router in the first stage and the one or more routers in the adjacent second stage.

15. The computer-readable storage medium according to claim 8, wherein the multi-stage router network comprises a Clos network.

16. The computer-readable storage medium according to claim 8, wherein the multi-stage router network comprises a core stage, an aggregation stage, and an access stage.

17. The computer-readable storage medium according to claim 8, wherein the instructions, upon execution, further cause the computer system to:
monitor a number of available connections between the first router in the first stage and one or more routers in at least two stages adjacent to the first stage;
send a notification that the first router is unavailable, when the number of available connections between the first router in the first stage and the one or more routers in one of the at least two stages falls below the first threshold number.

18. The computer readable storage medium according to claim 8, wherein the first threshold number and the second threshold number are not equal.

19. A system, comprising:
a plurality of routers in a multi-stage router network, the plurality of routers arranged in at least a first stage, a second stage and a third stage of the multi-stage router network; and
a router monitoring service communicatively coupled to the plurality of routers, the router monitoring service operable to:
monitor a number of available connections between a first router in the first stage of the multi-stage router network, a second router in the first stage of the multi-stage router network, and one or more of the plurality of routers in the second stage of the multi-stage router network;

detect that the number of available connections to the first router falls below a first threshold number;

detect that the number of available connections to the second router falls below a second threshold number;

send a notification to one or more of the plurality of routers in the third stage of the multi-stage router network based on the number of available connections for the first router falling below the first threshold number and the number of available connections for the second router falling below the second threshold number that the first and second routers in the first stage are deprioritized; and operate the one or more routers in the third stage so that communications to the first stage are routed to one or more other routers in the first stage.

20. The system according to claim 19, wherein the router monitoring service is further operable to:

determine that a connection between the first router in the first stage and at least one of the plurality of routers in the second stage is unavailable.

21. The system according to claim 19, wherein the router monitoring service is further operable to:

disconnect the first router in the first stage during a maintenance activity.

22. The system according to claim 21, wherein the router monitoring service is further operable to:

upon detecting the number of available connections is equal to or greater than the first threshold number, send a notification to the one or more of the plurality of routers in the third stage of the multi-stage router network that the first router in the first stage is priority normalized.

23. The system according to claim 19, wherein the first threshold number and the second threshold number are not equal.

* * * * *